C. WÜST-KUNZ.
MACHINE FOR MILLING DOUBLE HELICAL TOOTHED WHEELS.
APPLICATION FILED JULY 25, 1904.
936,973.
Patented Oct. 12, 1909.
2 SHEETS—SHEET 1.
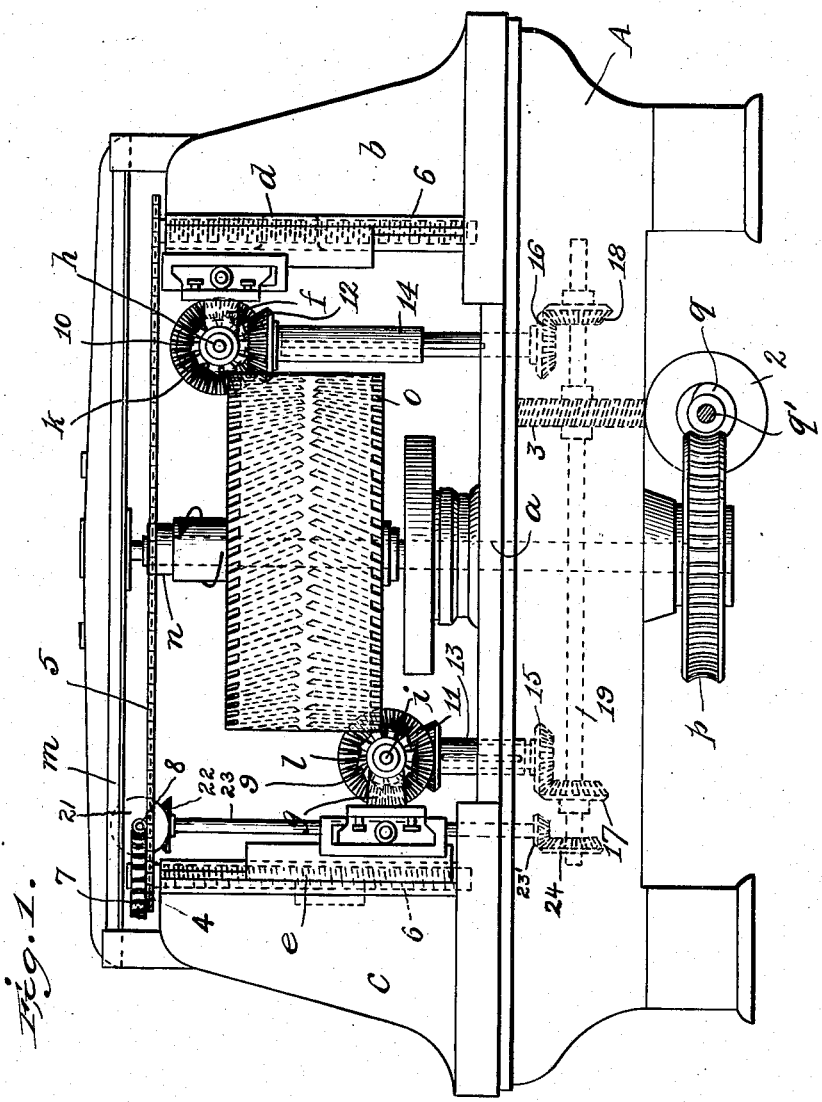
Witnesses
Jesse N. Sutton
M. J. Ellis
Inventor
Caspar Wüst-Kunz
By
Henry Orth Jr.
Attorney C. WUST-KUNZ.
MACHINE FOR MILLING DOUBLE HELICAL TOOTHED WHEELS.
APPLICATION FILED JULY 25, 1904.
936,973.
Patented Oct. 12, 1909.
2 SHEETS—SHEET 2.
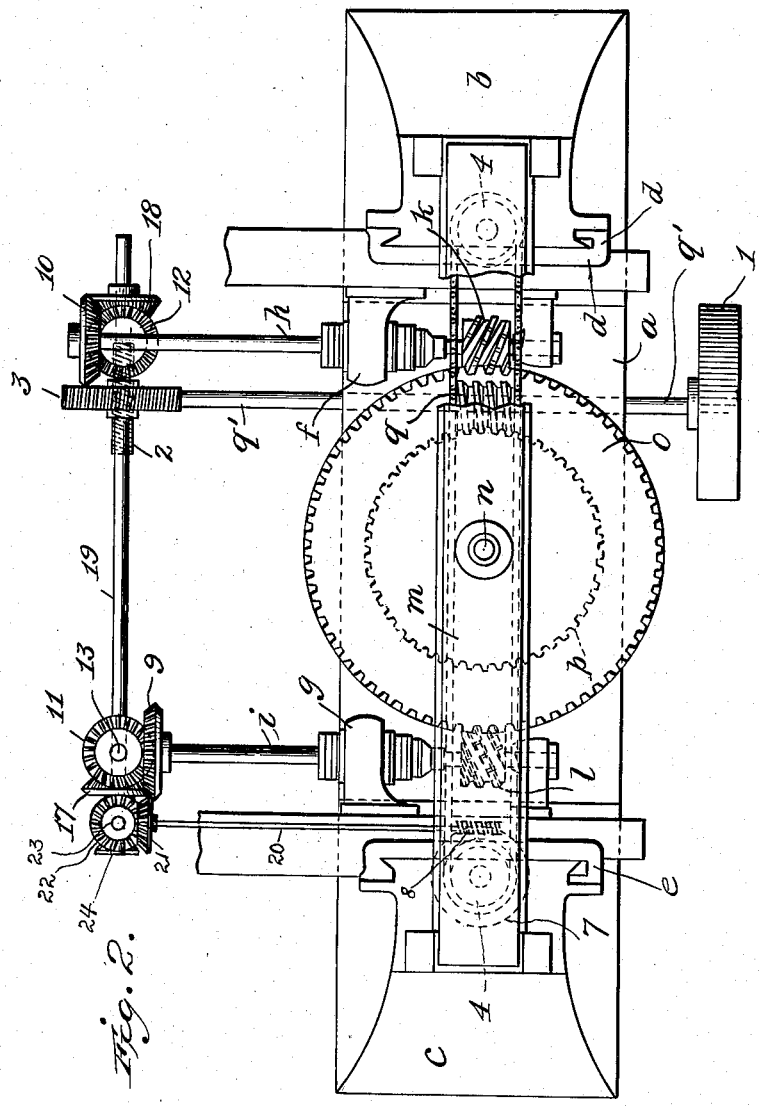

UNITED STATES PATENT OFFICE.

CASPAR WÜST-KUNZ, OF SEEBACH, NEAR ZURICH, SWITZERLAND.

MACHINE FOR MILLING DOUBLE HELICAL-TOOTHED WHEELS.

936,973.

Specification of Letters Patent. Patented Oct. 12, 1909.

Application filed July 25, 1904. Serial No. 218,045.

*To all whom it may concern:*

Be it known that I, CASPAR WÜST-KUNZ, a citizen of the Republic of Switzerland, residing at Seebach, near Zurich, in Switzerland, have invented new and useful Improvements in Machines for Milling Double Helical-Toothed Wheels, of which the following is a specification.

The machines hitherto employed for milling doubled helical toothed wheels have had the drawback that with those machines it was not possible to mill the teeth running in both directions, that is to say, to mill both halves of the wheel face, at one and the same time. Consequently it has been necessary first to mill the teeth running in one direction of one half of the wheel and then mill the teeth running in the other direction of the other half of the wheel.

The present invention has now for its object to provide a machine for milling double helical teeth in which the above mentioned drawbacks are obviated and whereby the teeth running in both directions can be milled at one and the same time, thereby reducing the time required for the manufacture of a double helical toothed wheel as compared with the method of manufacture hitherto employed.

The drawings which are annexed to this specification illustrate by way of example, one construction of a machine according to this invention, Figure 1 being an elevation and Fig. 2 a plan thereof.

The milling machine shown comprises a plate $a$ on a suitable frame A, two supports $b$ and $c$ arranged opposite each other, and each provided with a traversing slide $d$ and $e$ respectively. The traversing slides carry movable spindle heads $f$, $g$ having spindles $h$, $i$ mounted therein, said spindles being driven by any suitable mechanism, preferably such a mechanism as will positively connect them. As an example of such a mechanism I have shown the spindles as each provided with a bevel gear wheel, 9 and 10 meshing with miter gear wheels 11 and 12 respectively. These miter gear wheels are mounted at the upper ends of telescoping shafts 13 and 14 on whose lower ends are miter gears 15 and 16 meshing with miter gears 17 and 18 on the auxiliary driving shaft 19 of the machine. This auxiliary driving shaft 19 carries in addition to the miter gears 17 and 18, a worm or helical gear 3 that meshes with a worm or helical gear 2 on a transverse shaft $q'$ which shaft is the main driving shaft of the machine and is provided with a belt pulley 1. On the shaft $q'$ is a worm $q$ that drives a worm wheel $p$ on the work spindle or shaft $n$ mounted between the supports $b$ and $c$ at right angles to the plate $a$ and whose upper end has bearing in a bar $m$ connecting the supports $b$ and $c$.

The slides $d$ and $e$ are traversed by screws 6 mounted in the supports and each screw carries a chain wheel 4 connected together by a chain 5. On one of the chain wheels 4 is a worm wheel 7 driven by a worm 8 serving to simultaneously rotate the screws 6 by reason of the chain connection 5. The worm 8 is mounted on a shaft 20 that carries a suitable miter gear 21, meshing with a miter gear 22 on the shaft 23 whose lower end carries a miter wheel 23' that meshes with a miter wheel 24 on shaft 19. The wheel $o$ which is to be cut or milled with double helical teeth is mounted on the spindle or shaft $n$. The shaft $n$ is connected positively with the spindles of the worm milling cutters $k$ and $l$.

The mode of operation of this construction of machine for milling double helical toothed wheels is as follows: The traversing slides $d$, $e$ with the milling cutters $k$, $l$ are set in such a manner that each milling cutter is caused to act upon one side of the face of the wheel $o$ which is mounted on the shaft $n$ (Fig. 1). Then the milling cutters are moved by means of the traversing slides toward the center plane of the wheel face while the two milling spindles are being rotated simultaneously in positive connection with the spindle $n$ by means of the worm gearing $p$ $q$. By this movement of the milling cutters which are traversed automatically toward the center plane of the wheel face, the desired double helical teeth are cut in both halves of the wheel face at the same time. The double helical toothed wheel is completely milled when the two milling cutters have reached the center plane of the wheel face. Thus it will be obvious that in order to cut a helical gear wheel by means of the helical cutters that the blank $o$ and the cutters must be driven at different proportionate speeds, *i. e.* the speed of rotation of the blank must be greater than that sufficient to cut a worm having the same pitch as the cutters.

The drawings illustrate the manufacture of a wheel made in accordance with Patent No. 765,950, dated July 26, 1904. More than two milling cutters with their appurtenant parts may be used in the same machine.

Having now particularly described and ascertained the nature of the said invention and in what manner the same is to be performed I declare that what I claim is:

1. In a machine for cutting double helical gear wheels, the combination with a wheel blank holder and means to continuously rotate the same; of a pair of oppositely movable, simultaneously traversable tool slides, equally spaced from the spindle of the blank holder and angularly separated, a helical milling tool in each slide arranged to cut in opposite directions, and connections for rotating the wheel blank holder, traversing the slides and rotating the tools in timed relation.

2. In a machine for cutting double helical gear wheels, the combination with a wheel blank holder and means to rotate the same continuously; of a pair of oppositely movable simultaneously traversable tool slides, a helical milling tool in each slide arranged to cut from opposite sides of the face of the blank, and connections for traversing the slides, rotating the wheel blank holder and for rotating the tools in timed relation.

3. In a gear cutting machine, the combination with a wheel blank carrier or work spindle; of worm cutting tools operating on the blank at opposite sides thereof, and connections for traversing the tools, rotating the blank carrier and rotating the tools in timed relation, said connections constructed to drive the blank carrier and blank at a speed greater than that of a worm gear having the same pitch as the cutters.

In testimony whereof I have signed my name to this specification in the presence of two subscribing witnesses.

CASPAR WÜST-KUNZ.

Witnesses:
E. BLUM,
M. VESTH.